US010071025B2

(12) United States Patent
Wilson

(10) Patent No.: US 10,071,025 B2
(45) Date of Patent: Sep. 11, 2018

(54) HANDSFREE BOTTLE SUPPORT HARNESS

(71) Applicant: Edna Wilson, Hoover, AL (US)

(72) Inventor: Edna Wilson, Hoover, AL (US)

( * ) Notice: Subject to any disclaimer, the term of this patent is extended or adjusted under 35 U.S.C. 154(b) by 0 days.

(21) Appl. No.: 15/593,419

(22) Filed: May 12, 2017

(65) Prior Publication Data

US 2017/0333293 A1 Nov. 23, 2017

Related U.S. Application Data

(60) Provisional application No. 62/337,426, filed on May 17, 2016.

(51) Int. Cl.
*A61J 9/06* (2006.01)
*F16M 13/02* (2006.01)

(52) U.S. Cl.
CPC ........... *A61J 9/0638* (2015.05); *A61J 9/0661* (2015.05); *F16M 13/022* (2013.01)

(58) Field of Classification Search
None
See application file for complete search history.

(56) References Cited

U.S. PATENT DOCUMENTS 1,567,225 A * 12/1925 Barbin ..................... A61J 9/06 248/102
1,886,619 A * 11/1932 Arnone ................. A61J 9/0684 248/105
2,050,622 A 8/1936 Menk
2,526,121 A * 10/1950 Curry .................... A61J 9/0669 248/102
2,772,801 A * 12/1956 Schwortz .................. A61J 9/06 215/11.6
D198,488 S 6/1964 Reis
3,648,958 A 3/1972 Araujo
4,718,623 A * 1/1988 McClure ................... A61J 9/06 248/102
4,895,327 A * 1/1990 Malone ................. A61J 9/0607 248/102
5,105,958 A * 4/1992 Patton ....................... A45F 3/16 215/14
D379,660 S * 6/1997 Aube ............................ 248/105
5,680,958 A * 10/1997 Mann ........................ A45F 3/14 220/739
5,820,084 A * 10/1998 Trumbauer ........... A61J 9/0669 248/102

(Continued)

*Primary Examiner* — Muhammad Ijaz
(74) *Attorney, Agent, or Firm* — Global Intellectual Property Agency, LLC; Jordan Sworen

(57) ABSTRACT

A handsfree bottle support harness for supporting a bottle. The handsfree bottle support harness includes a base having a first end and second end, a top surface and bottom surface, wherein the top surface contains a channel tapering from the first end to the second end. The channel is configured to hold the mouth of a bottle facing the second end of the base. The bottle is held in place by a strap having a first end connected to the first end of the base and a second end removably secured to the second end of the base. The base contains a belt within a compartment therein having a pair of distal ends configured to removably secure to one another. In another embodiment, an attachable component is removably securable to the base to allow for the height adjustment of the bottle position.

13 Claims, 4 Drawing Sheets

(56) References Cited

U.S. PATENT DOCUMENTS

| | | | | |
|---|---|---|---|---|
| 5,979,843 | A * | 11/1999 | Beck | A61J 9/0669 248/102 |
| 6,082,681 | A * | 7/2000 | Rand | A61J 9/06 248/102 |
| 6,592,084 | B1 * | 7/2003 | Nile | A61J 9/0638 248/102 |
| 7,275,662 | B1 | 10/2007 | Milcetich | |
| 2003/0183640 | A1 * | 10/2003 | Bissell | B65D 23/106 220/741 |
| 2005/0103954 | A1 * | 5/2005 | Touma | A61J 9/0638 248/103 |
| 2010/0307649 | A1 * | 12/2010 | Santos Dominguez | A45C 13/02 150/107 |
| 2012/0278976 | A1 * | 11/2012 | Benton | A42B 3/08 2/421 |
| 2014/0277303 | A1 * | 9/2014 | Biser | A61F 7/02 607/104 |
| 2017/0333293 | A1 * | 11/2017 | Wilson | A61J 9/0638 |

* cited by examiner

HANDSFREE BOTTLE SUPPORT HARNESS

CROSS REFERENCE TO RELATED APPLICATION

This application claims the benefit of U.S. Provisional Application No. 62/337,426 filed on May 17, 2016. The above identified patent application is herein incorporated by reference in its entirety to provide continuity of disclosure.

BACKGROUND OF THE INVENTION

The present invention relates to bottle support devices. More specifically, the present invention provides a bottle support harness for supporting a bottle to feed a child in a handsfree manner.

It can be difficult in some circumstances to complete various tasks with the additional responsibility of taking care of an infant. Infants require frequent feeding from a bottle. This typically involves a parent cradling an infant, whether in a sitting or standing position, and manually providing the mouth of a bottle to the infant so it can properly feed. It can be impossible to feed an infant in some circumstances, for example, when driving or performing a task that requires both hands in order to complete the task. The infant may cry until he or she is fed which can be irritating and distracting to individuals near the infant.

Devices have been disclosed in the known art that relate to baby bottle support devices. These include devices that have been patented and published in patent application publications. These devices generally relate to bottle support devices such as: a nursing bottle support, a baby bottle holder, a bottle holder for babies, a basket for a baby bottle, and a bottle support device used in a refrigerator for dispensing water.

These known art devices have several known drawbacks. Some of the devices employ friction and the shape of the bottle support channel to keep the bottle in place. These devices fail to disclose a removably securable strap, that can hold various sized and shaped bottles in a desired position. Additionally, the devices are placed in the desired location, such as on a pillow or resting on a child, rather than being securely harnessed to an object, such as a stroller or carrier. Without the use of a belt, a mobile child will cause the mouth of the bottle to move out of the desired feeding position.

In light of the devices disclosed in the known art, it is submitted that the present invention substantially diverges in design elements from the known art and consequently it is clear that there is a need in the art for an improvement to existing bottle support devices. In this regard, the instant invention substantially fulfills these needs.

SUMMARY OF THE INVENTION

In view of the foregoing disadvantages inherent in the known types of bottle support devices now present in the known art, the present invention provides a new handsfree bottle support harness wherein the same can be utilized for providing convenience for the user when bottle feeding a baby.

It is therefore an object of the present invention to provide a new and improved handsfree bottle support harness device that has all of the advantages of the prior art and none of the disadvantages. The handsfree bottle support harness comprises a base having a first end and second end, a top surface and bottom surface, wherein the top surface contains a channel tapering from the first end of the base to the second end of the base, wherein the channel is configured to hold the mouth of a bottle facing the second end of the base. The bottle is held in place by a strap having a first end and second end, wherein the first end of the strap is connected to the first end of the base, and the second end of the strap is removably secured to the second end of the base. The base contains a belt, disposed within a compartment in the base, having a pair of distal ends configured to removably secure to one another.

It is another object of the present invention to provide an attachable component having an upper surface configured to removably secure to the bottom surface of the base, wherein the upper surface of the attachable component comprises a same dimension as the bottom surface of the base such that the upper surface and bottom surface rest flush against one another.

Another object of the present invention is to provide a handsfree bottle support harness that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
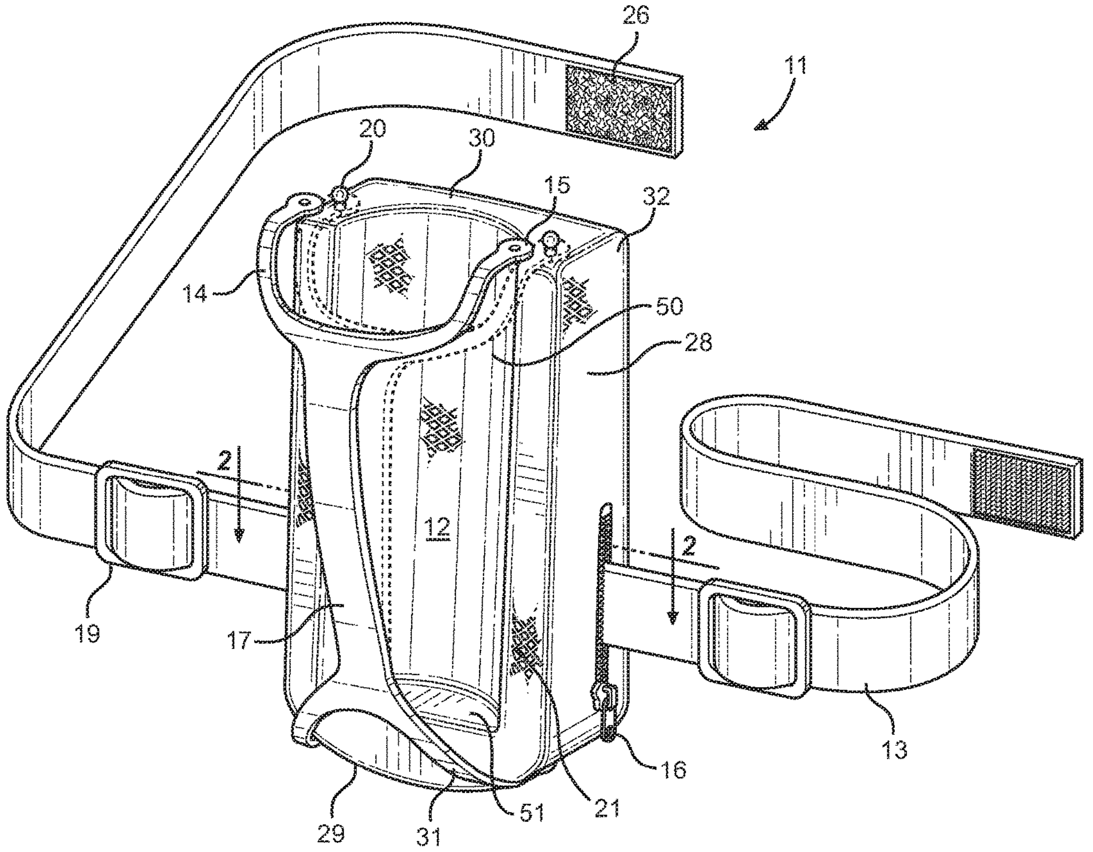
FIG. 1 shows a perspective view of the handsfree bottle support harness, wherein the strap is in an open position.

Reference is made herein to the attached drawings. Like reference numerals are used throughout the drawings to depict like or similar elements of the handsfree bottle support harness. For the purposes of presenting a brief and clear description of the present invention, the preferred embodiment will be discussed as used for feeding a baby utilizing the handsfree bottle support harness while lying in a horizontal position. The figures are intended for representative purposes only and should not be considered to be limiting in any respect.

Referring now to FIG. 1, there is shown a perspective view of the handsfree bottle support harness, wherein the strap is in an open position. The handsfree bottle support harness 11 comprises a base 28 having a first end 29 and a second end 30, a top surface 12 and bottom surface, wherein the top surface 12 contains a channel 50 tapering from the first end 29 to the second end 30, wherein the channel 50 is configured to receive and support the mouth of a bottle facing the second end 30 of the base 28. The channel 50 extends from the second end 30 of the base 28 towards the first end 29 of the base, such that the channel is open on the second end 30 and contains a wall 51 on the first end 29 thereof. The base 28 shown in this embodiment has a rectangular perimeter with rounded edges 32, providing for a safer design. However, in other embodiments, the base 28 can be any suitable shape, and can be configured as an oval, square, or rectangle. The base 28 of the device is constructed of a forgiving material, such as foam, which will be soft to the touch. In alternative embodiments, the base 28 includes a fabric cover 21 removably securable thereto via fasteners, such as snaps, zippers, or hook and loop material. In some embodiments, the fabric cover 21 comprises a plurality of pockets constructed for storing various articles within the fabric cover 21 against the base 28.

The handsfree bottle support harness further comprises a strap 17 which is removably secure to the base 28. The strap 17 has a first end 31 and second end 14, each securable to the base 28. In the illustrated embodiment, the first end 31 of the strap 17 is connected to the first end 29 of the base 28, and the second end 14 of the strap 17 is removably secured to the second end 30 of the base 28, allowing a bottle to remain secure in a desired position. In the illustrated embodiment, the securable strap 17 is in the H configuration, wherein the second end 14 of the strap 17 in the H configuration allows the strap 17 to fit over the neck of the bottle and rest flush thereagainst. In an alternative embodiment, the strap 17 is constructed of an elastic material which can be stretched and secured over bottles of different lengths and diameters.

The second end 14 of the strap 17 comprises a pair of fasteners that can be removable secure to the base 28. In the shown embodiment, fasteners include a pair of apertures 15 and corresponding protrusions 20 configured to removable secure to the second end 30 of the base 28. Each aperture 15 is disposed on opposing sides of the second end 14 of the strap 17. In the illustrated embodiment, the protrusions 20 are positioned on opposing sides of the channel 50 of the base 28, such that the apertures 15 and protrusions 20 align with one another. The apertures 15 and protrusions 20 are substantially similar in diameter such that the apertures 15 remain secure to the protrusions 20 when disposed thereover.

Figure 2:
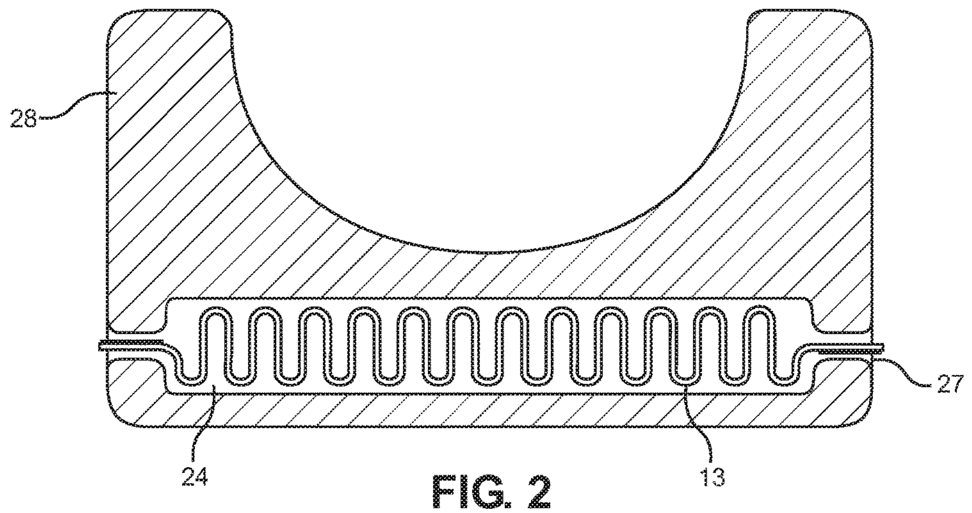
FIG. 2 shows a cross sectional view of the base taken along line 2-2 of FIG. 1, wherein the belt is housed.

Referring now to FIG. 1 and FIG. 2, there is shown a perspective view of the handsfree bottle support harness, wherein the strap is in an open position and a cross sectional view of the base taken along line 2-2 of FIG. 1, wherein the belt is housed, respectively. The handsfree bottle support harness comprises a belt 13 that is stored within a compartment 24 in the base 28. The belt 13 is attached within a compartment 24 in the base 28, wherein the compartment 24 is accessible via fasteners 16. The belt 13 comprises a pair of distal ends 26 configured to removably secure to one another in order to form a loop around a child carrying device, such as a stroller or baby carrier. In the illustrated embodiment, the fasteners 16 providing access to the compartment 24 are zippers, however, these fasteners 16 can be configured as buttons, snaps, or hoop and loop material. In the illustrated embodiment, there is only one compartment 24, with two openings 27 on opposing sides of the base 28. This allows for the removal of the belt 13 through the openings 27 of the compartment, and the ability to replace the belt 13 with additional belts varying in size and length. However, this does not limit the amount or size of compartments that can be hidden within the base 28.

Figure 3:
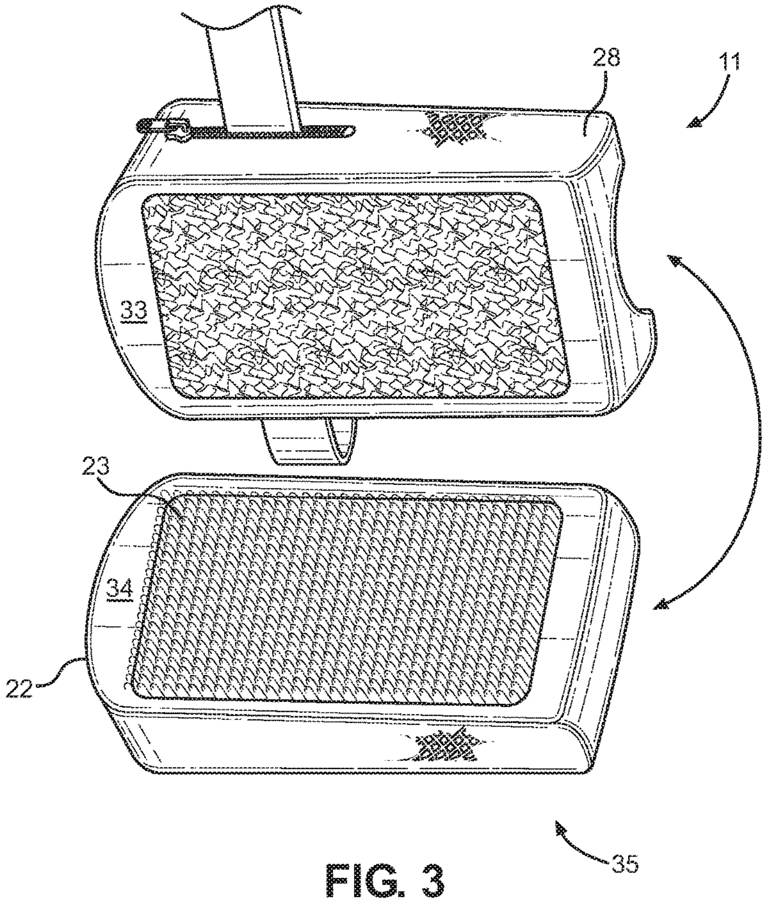
FIG. 3 shows a perspective view of the bottom surface of the base and the top surface of the attachable component of the handsfree bottle support harness.

Referring now to FIG. 3, there is shown a perspective view of the bottom surface of the base and the top surface of the attachable component of the handsfree bottle support harness. In this alternative embodiment, the handsfree bottle support harness 11 includes an attachable component 35 having an upper surface 34 configured to removably secure to the bottom surface 33 of the base 28, wherein the upper surface 34 of the attachable component comprises a same dimension as the bottom surface 33 of the base 28 such that the upper surface 34 and bottom surface 33 rest flush against one another. In the illustrated embodiment, the attachable component 35 is removably securable to the base 28 via hook and loop material 23. In the illustrated embodiment, the hook and loop material 23 covers at least two-thirds of the surface area of the bottom surface 33 of the base 28 and the upper surface 34 of the attachable component 35. However, in other embodiments, the attachable component 35 can be removably secured by zippers, buttons, or snaps, and is not limited to hook and loop material.

Figure 4:
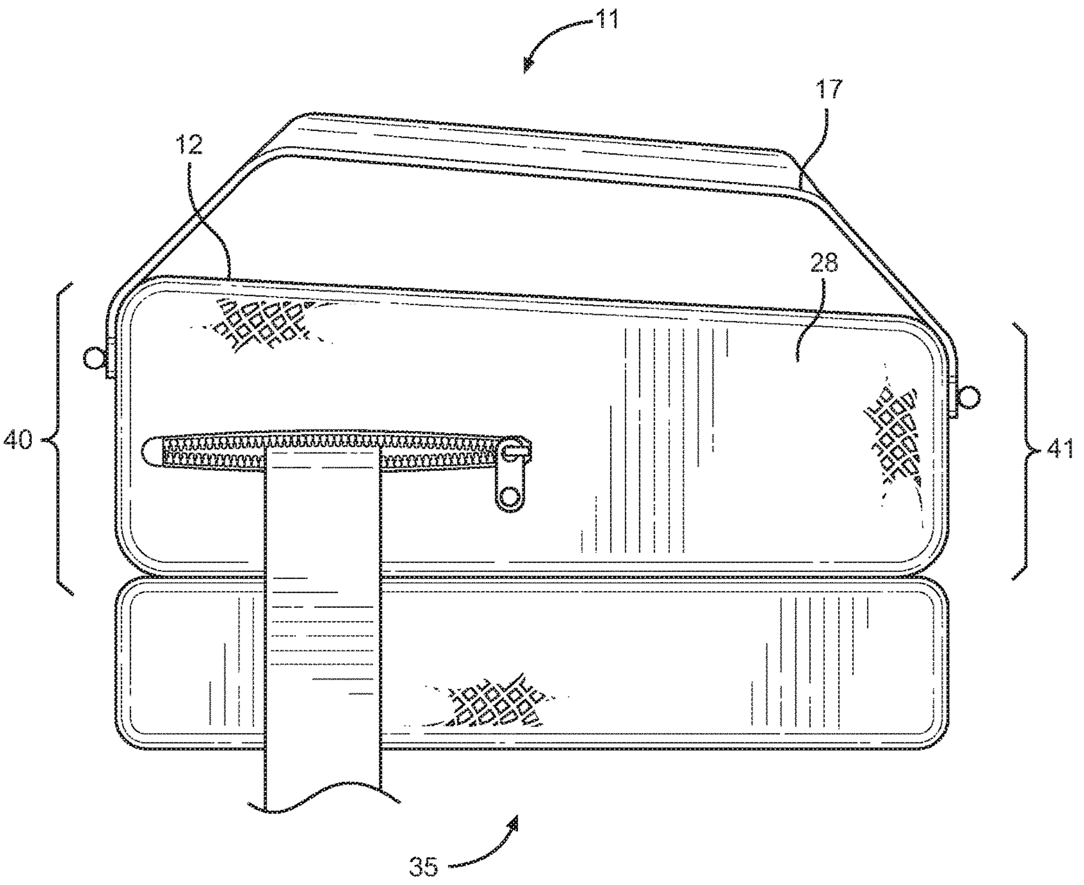
FIG. 4 shows a side view of the handsfree bottle support harness having the attachable component in an attached position.

Referring now to FIG. 4, there is shown a side view of the handsfree bottle support harness having the attachable component in an attached position. The attachable component 35 is configured to support the handsfree bottle support harness 11 against a torso of a wearer, so as to position a received bottle at varying distances from the wearer. In the illustrated embodiment, the attachable component 35, when connected to the handsfree bottle support harness 11 is adapted to raise the bottle mouth higher above the torso of the wearer when the securable strap 17 is in the closed position. This embodiment allows access to the bottle mouth when used with children of different sizes or in varying positions. In the illustrated embodiment, the first end of the base 28 has a first thickness 40 extending upwardly from the bottom surface to the top surface 12, and the second end of the base 28 has a second thickness 41 extending upwardly from the bottom surface to the top surface 12, wherein the top surface 12 bevels from the first thickness 40 to the second thickness 41 of the base 28. In this embodiment, the beveled top surface 12 is constructed for placing the bottle at an angle. When the device is in a horizontal position, this angle provides liquid towards the bottle mouth, thereby allowing the user to continually drink.

Figure 5:
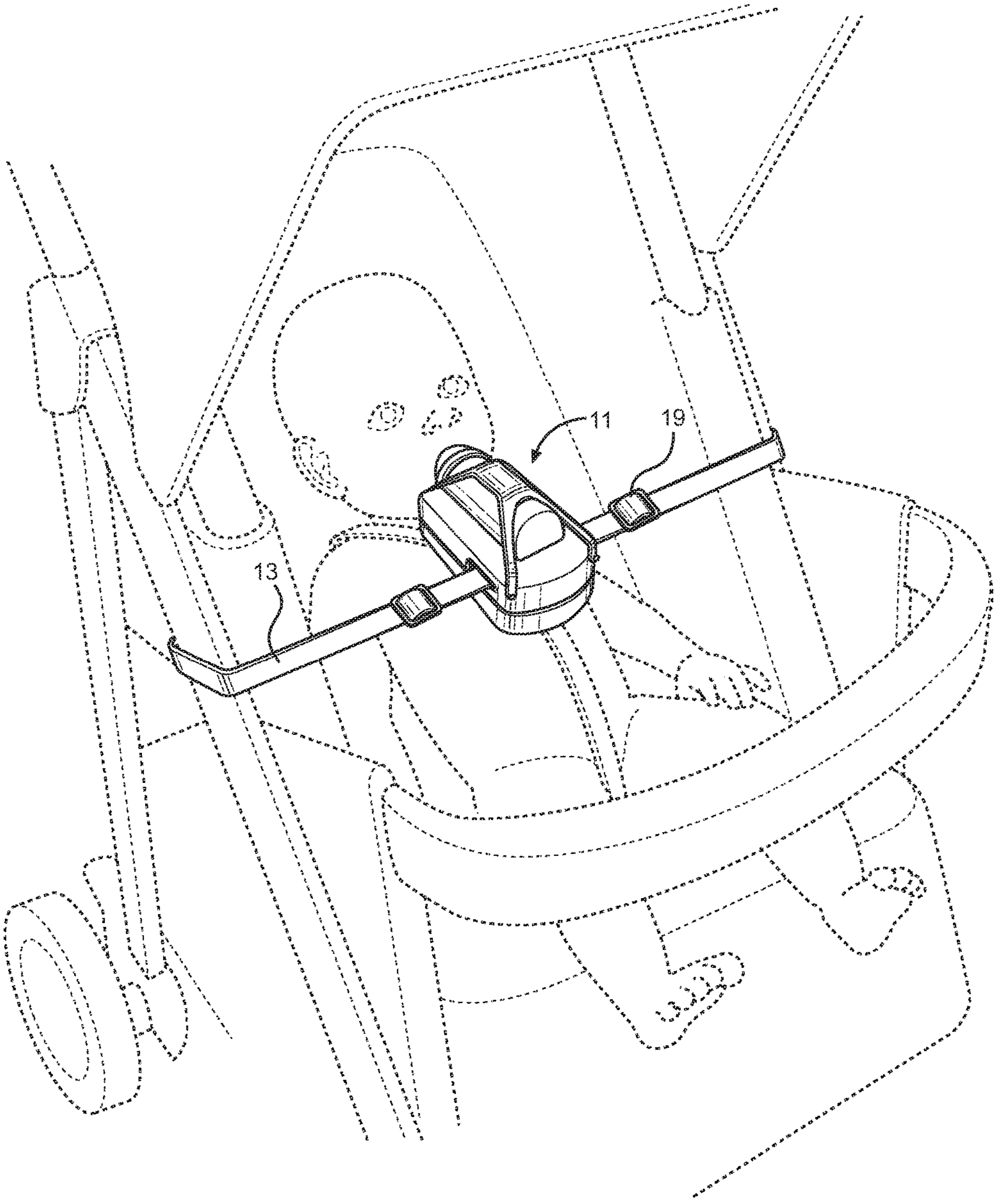
FIG. 5 shows a perspective view of the handsfree bottle support harness secured to a stroller.

Referring now to FIG. 5, there is shown a perspective view of the handsfree bottle support harness secured to a stroller. In operation, the handsfree bottle support harness 11 is positioned on or above the torso of a child, providing easy access to the mouth of the bottle. In the illustrated embodiment, the distal ends of the belt 13 are positioned around the stroller creating a removably secured loop using loop and hook material. In the illustrated embodiment, the belt can be adjusted via buckles 19, or any suitable mechanism. In alternative embodiments, the device 11 is positioned around an object wherein the baby is placed, such as a baby carrier or car seat.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A handsfree bottle support harness comprising:

a base having a first end and a second end, a top surface and a bottom surface, wherein the top surface includes a channel configured to receive a bottle;

wherein the channel tapers from the first end of the base to the second end of the base;

a strap having a first end and a second end, wherein the first end of the strap is connected to the first end of the base, and the second end of the strap is removable secured to the second end of the base, wherein the handsfree bottle support harness is configured to selectively secure the bottle between the channel and the strap; and a belt disposed within a compartment in the base, the belt having a pair of distal ends configured to removably secure to one another.

2. The handsfree bottle support harness of claim 1, wherein the strap comprises two first arms connected on a top end of an elongated member and two second arms connected on a bottom end of the elongated member.

3. The handsfree bottle support harness of claim 1, wherein the second end of the strap comprises a pair of apertures configured to removably secure to a pair of protrusions disposed on the second end of the base.

4. The handsfree bottle support harness of claim 1, wherein the base comprises a pair of openings disposed on opposing sides thereof, wherein each opening provides access to the compartment.

5. The handsfree bottle support harness of claim 4, wherein the pair of openings are accessible via fasteners.

6. The handsfree bottle support harness of claim 1, wherein the pair of distal ends of the belt comprise hook and loop material so as to allow the belt to form a loop.

7. The handsfree bottle support harness of claim 1, further comprising an attachable component having an upper surface configured to removably secure to the bottom surface of the base, wherein the upper surface of the attachable component comprises a same dimension as the bottom surface of the base such that the upper surface and the bottom surface rest flush against one another.

8. The handsfree bottle support harness of claim 7, wherein the attachable component is removably securable to the base via hook and loop material.

9. The handsfree bottle support harness of claim 1, wherein the channel extends from the second end of the base towards the first end of the base, such that the channel is open on the second end of the base and contains a wall on the first end of the base thereof.

10. The handsfree bottle support harness of claim 1, wherein the first end of the base has a first thickness, and the second end of the base has a second thickness, wherein the first thickness is larger than the second thickness, such that the top surface bevels from the first thickness to the second thickness.

11. The handsfree bottle support harness of claim 1, wherein the base is securely disposed within a fabric cover.

12. A handsfree bottle support harness comprising:

a base having a first end and a second end, a top surface and a bottom surface, wherein the top surface includes a channel configured to receive a bottle;

a strap having a first end and a second end, wherein the first end of the strap is connected to the first end of the base, and the second end of the strap is removable secured to the second end of the base, wherein the handsfree bottle support harness is configured to selectively secure the bottle between the channel and the strap; and a belt disposed within a compartment in the base, the belt having a pair of distal ends configured to removably secure to one another;

wherein the strap comprises two first arms connected on a top end of an elongated member and two second arms connected on a bottom end of the elongated member.

13. A handsfree bottle support harness comprising:

a base having a first end and a second end, a top surface and a bottom surface, wherein the top surface includes a channel configured to receive a bottle;

a strap having a first end and a second end, wherein the first end of the strap is connected to the first end of the base, and the second end of the strap is removable secured to the second end of the base, wherein the handsfree bottle support harness is configured to selectively secure the bottle between the channel and the strap;

a belt disposed within a compartment in the base, the belt having a pair of distal ends configured to removably secure to one another; and an attachable component having an upper surface configured to removably secure to the bottom surface of the base, wherein the upper surface of the attachable component comprises a same dimension as the bottom surface of the base such that the upper surface and the bottom surface rest flush against one another.

* * * * *